Feb. 26, 1929.
C. S. BUSHNELL
1,703,835
BRAKE APPLYING APPARATUS
Original Filed March 20, 1925
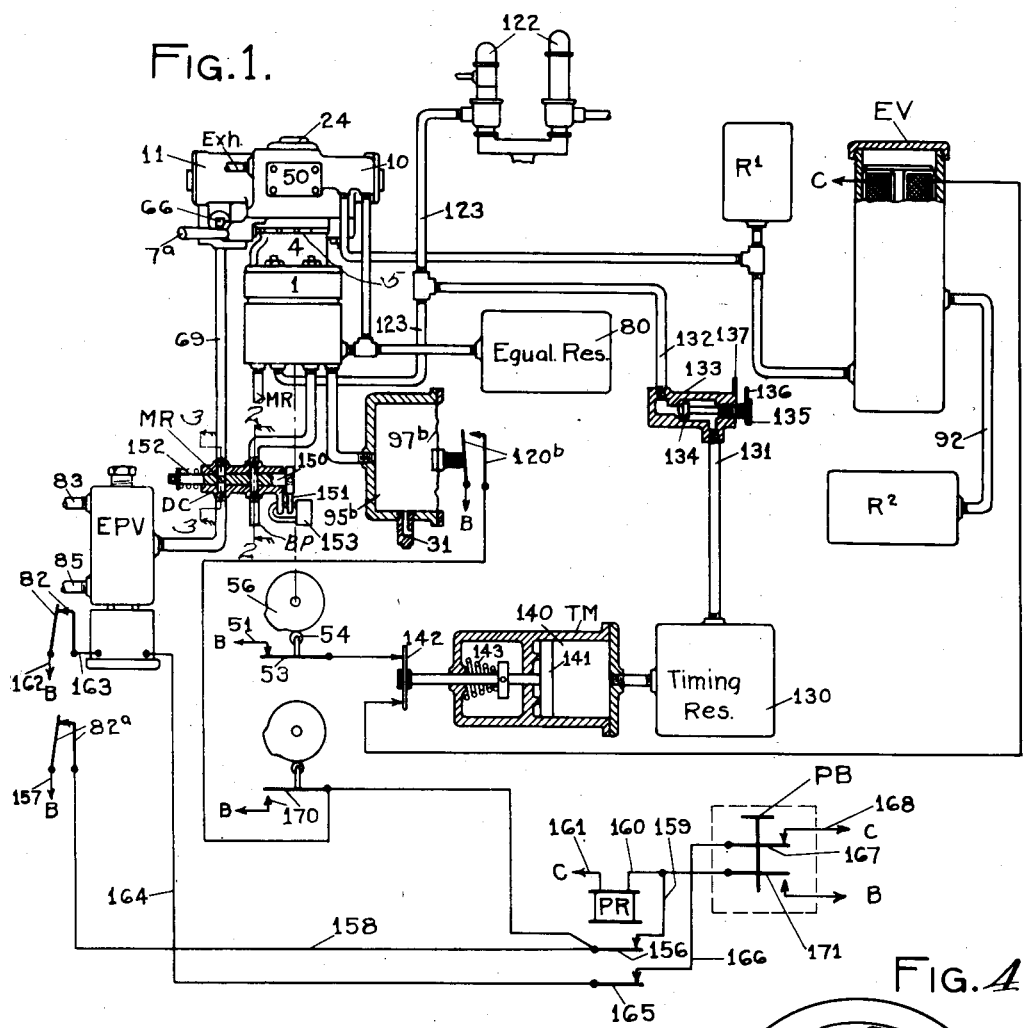
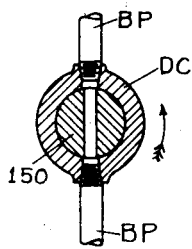
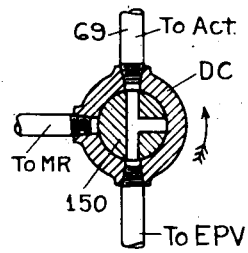
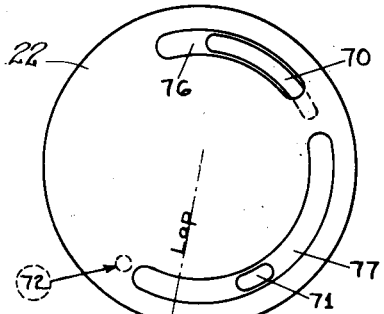

Patented Feb. 26, 1929.

1,703,835

UNITED STATES PATENT OFFICE.

CHARLES S. BUSHNELL, OF ROCHESTER, NEW YORK, ASSIGNOR TO GENERAL RAILWAY SIGNAL COMPANY, OF ROCHESTER, NEW YORK.

BRAKE-APPLYING APPARATUS.

Original application filed March 20, 1925, Serial No. 16,937. Divided and this application filed April 7, 1927. Serial No. 183,892.

This invention relates to brake applying apparatus for railway trains, and more particularly to control apparatus adapted for controlling the brakes of such trains either manually or automatically.

In applying train control to railway systems, it has been found expedient to use the same device for effecting a brake application automatically as that used by the engineer for effecting a brake application for various reasons some of which will now be given. If an automatic brake application is made by suitable train control apparatus it is essential that the engineer should not be permitted to annul such a brake application by re-charging the brake pipe and for this reason the engineer's brake valve itself is preferably moved as far as the lap position at least, if a predetermined reduction only in brake pipe pressure is to be made the same device is preferably used so that a second predetermined reduction is not made on top of the first predetermined reduction, and further it is desirable to effect an automatic brake application and manual brake application by the same device so that, by reason of the fact that since automatic brake applications only seldom occur, and if the same device is used for effecting a manual and an automatic application the mechanism does not stand idle as much but is operated repeatedly by the engineer when making a manual brake application. It has been experienced in the application of automatic train control to railways that a two-stage brake application is much safer in preventing break-in-twos and buckling of trains when an automatic brake application is made. One of the problems confronted in designing brake control mechanism for making a two-stage brake application is the determination of the period of time intervening between the two stages. In order to discuss this further it is considered advisable to review briefly the operation of the usual air brake system.

In the usual air brake system a service brake application is effected by venting the usual equalizing reservoir to a predetermined extent and usually to that pressure at which the auxiliary reservoir pressure equalizes with that of the brake cylinder on an average car. This reduction in equalizing reservoir pressure causes the equalizing discharge piston valve located directly under the engineer's brake valve to open and discharge brake pipe pressure until the brake pipe pressure has been reduced to that of the equalizing reservoir pressure. This equalizing discharge piston valve is designed so that this valve gradually closes as the pressure in the brake pipe approaches that of the pressure on the other side of the piston, namely, the equalizing reservoir pressure, consequently the blowing off of air is tapered, so to speak, and the rate of discharge is not in proportion to pressure only but is dependent on the pressure in the brake pipe and the opening afforded by this equalizing discharge piston valve. Since the flow of air from the brake pipe through this equalizing discharge piston valve is tapered as just explained, a two-stage brake application even though the second stage starts immediately after the first stage has been completed, is different from a single stage brake application effecting the same reduction in brake pipe pressure; this being true because in the two-stage brake application the pressure above the equalizing discharge piston is reduced say half as much in each stage, so that two tapering discharge periods transpire, whereas if a single reduction is made a single taper discharge period transpires. Obviously, the effect of two light tapering discharges of air from the brake pipe will have a different effect on the triple valves of the cars of the train than will one heavy tapering discharge. Bearing this discussion in mind, it readily appears that the second stage reduction might even be started before the first reduction stage has been completed, and still effect a brake application that is different from a single stage brake application.

One of the reasons for employing a two-stage brake application is that the slack between cars shall first be taken up before a heavy brake application takes place, so as to avoid buckling of the train; and since the taking up of the slack depends upon the length of the train, the grade of the track, the speed of the train and the like, it is difficult to determine how the two reductions of a two-stage application should be spaced; this same thing also being true of break-in-twos. Net, it is difficult to determine definitely just what kind of a two-stage brake application should be made to suit the various conditions encountered in practice.

In accordance with the present invention it is therefore proposed to either start the second reduction a predetermined time after the first reduction has been started, which may be varied according to the length of the train and the particular grade on which the train is traveling at the time, to have this time fixed for all conditions or to have the second stage reduction start immediately after the first stage has been completed.

More specifically it is proposed in accordance with the present invention to modify the usual engineer's brake valve by closing up the usual equalizing reservoir service exhaust port and adding a supplemental valve which vents the equalizing reservoir into one or more closed reduction reservoirs when the engineer's brake valve is in the service position, and to vent these reduction reservoirs to atmosphere when the engineer's brake valve is in the release or running position but not when in the lap position; to provide automatic means for operating the usual engineer's brake valve and this supplemental valve to the service position and during such operation unlatch the handle of the engineer's brake valve so that the engineer can not prevent the automatic operation taking place and also to avoid injury due to automatic movement of such handle; and to provide means for connecting the two reduction reservoirs together a suitable period of time after an automatic brake application is initiated.

As a further object of the present invention it is proposed to provide means for penalizing the engineer if he does not anticipate the automatic means in starting a brake application himself or does not properly control the train.

Other objects, purposes and characteristic features of the invention will in part be pointed out in the description hereinafter and in part be obvious from the drawings.

In describing the invention in detail reference will be made to the accompanying drawings in which:—

Fig. 1 shows an embodiment of the invention including brake applying mechanism in which the second stage reduction is started a definite period of time after the first reduction is started, this period of time being adjustable for the particular train and grade, together with means for penalizing the engineer if he does not properly control his train;

Fig. 2 is a section taken on the line 15—15 Fig. 1;

Fig. 3 is a section taken on the line 16—16 Fig. 1; and

Fig. 4 shows the ports of the supplemental service exhaust valve used in the arrangement shown in Fig. 1.

In describing the invention the usual engineer's brake valve as modified together with the actuator and supplemental service exhaust valve will not be described in detail since reference to the parent application, in which such description is made, may be had.

This application is a division of my prior application Ser. No. 16,937 filed March 20, 1925, now Patent No. 1,628,454 dated May 10, 1927.

Referring to Fig. 1 the usual engineer's brake valve 1, having a modified form of cap member or main frame 4 including the notched sector 5 projecting horizontally therefrom into which the latch plunger associated with the engineer's brake valve handle $7^a$ may engage, has been shown. On the flange just mentioned are bolted the cylinders 10 and 11 of the automatic brake valve actuator. It should be noted that the cylinders 10 and 11 are of different diameter so that different forces are exerted by the pistons contained therein. Both of these cylinders normally contain main reservoir pressure, the small one of which is directly connected to main reservoir pressure existing on top of the rotary valve of the engineer's brake valve. The large cylinder is normally, when the electro-pneumatic valve EPV controlled by suitable train control means controlling the contacts 82 and $82^a$ is energized, connected to main reservoir pressure through pipes 83 and 69, but is vented to atmosphere through pipe 85 when the device EPV is de-energized, as a result of which the piston in the small cylinder operates the usual rotary valve and an auxiliary valve to a brake applying position. In the top part of the actuator and below the cover 24 is contained a supplemental rotary valve 22 (see Fig. 4) which is operatively connected to the usual rotary valve and is always moved therewith thus supplemental valve contains an opening 76 and a cavity 77, and is seated on a valve seat containing openings 70, 71 and 72. The opening 70 is connected to the equalizing reservoir 80, the opening 71 is connected to the reduction reservoir $R^1$ and the opening 72 is connected to atmosphere. The opening 76 extends through the supplemental valve 22 and is under any position of the engineer's brake valve handle in communication with the opening 70, so that the valve 22 is held against its seat by equalizing reservoir pressure. The cavity 77 is so located and of such size that it connects the equalizing reservoir 80 to the reduction reservoir $R^1$ when the engineer's brake valve handle is in the service or energizing position and connects the reduction reservoir $R^1$ to the atmosphere port 72 when the engineer's brake valve handle is in the release, running or holding position, and blanks the reduction reservoir opening 71 when the engineer's brake valve handle is in the lap position. The brake valve actuator including cylinders 10 and 11 is so constructed that the engineer's handle $7^a$ is unlatched and disconnected so far as operation of the main rotary valve and the auxiliary toward the release position by such handle is concerned when the actuator operates these valves to make an automatic brake application, but this handle is always in condition to operate these valves to the energizing position. For a detailed description of the brake valve actuator and the various passages associated with the auxiliary valve reference should be had to the parent patent above mentioned.

As heretofore intimated, it is contemplated in accordance with the present invention to penalize the engineer if he does not properly control his train; or putting it another way, reward the engineer if he controls his train properly. In the application of train control to existing railways, and signalling systems, one theory of safeguarding the train to the maximum extent is based on the idea of maintaining the safety afforded by the engineer without automatic train control and add to this safety that afforded by the automatic train control mechanism. If train control is added without the provision of means for stimulating the vigilance of the engineer, he is apt to rely too much on the automatic apparatus, especially after he has convinced himself that it is very reliable; and if he does rely on the automatic apparatus, the automatic apparatus is really a substitute for the engineer and is not a supplemental and additional safeguard to that of the engineer.

It is therefore proposed in accordance with the present invention to penalize the engineer if the automatic brake applying means functions and the engineer has not already started a bonafide brake application, which may be either a single or multiple stage full service brake application. Since the brake application made by the engineer need only be a reduction to give a full service brake application it is unnecessary, and a waste of air, to allow the automatic apparatus to make a further reduction in brake pipe pressure after the engineer has already started or completed the necessary reductions to give a full service brake application, and in accordance with the invention shown in Fig. 1 if automatic operation of the actuator takes place after the engineer has already made a full service brake application no further venting of the brake pipe takes place. Also, in this event the engineer is rewarded, so to speak, for having made a brake application before the automatic apparatus began functioning, which reward in the arrangement shown consists in the engineer's ability to release the brakes after the train control mechanism again assumes its normal condition and recloses contacts 82 and 82ª without necessarily bringing the train to a full stop.

When two engines are used in tandem to pull a train, which is commonly called "double heading", the double heading cock, contained in the pipe connecting the brake pipe to the engineer's brake valve, of the second engine must be closed. Also, the second engine when double heading, especially in certain types of train control systems, can not receive control influences inductively from the trackway and therefore is not subjected to automatic train control, so that, it is desirable to cut out the automatic control for the actuator of the second engine under this condition. Since it is necessary to operate the cut-out cock, which is usually located in the cab, when double heading, and still fix it so that the engineer can not avoid an automatic brake application when single heading by shutting off this cock when the actuator begins to operate, these two cocks (cut-out and double heading cock) are preferably mechanically interlocked, and are locked by the same padlock, the key of which is preferably held by the conductor of the train.

In addition to the apparatus already mentioned Fig. 1 shows the usual air compression governors 122 which control the main reservoir pressure by controlling the flow of steam to the air compressors which are used in connection with the usual air brake system. These governors 122 are connected to the engineer's brake valve through the excess pressure head or governor pipe 123 in the usual way, this pipe 123 through a port in the rotary valve of the engineer's brake valve being connected to main reservoir pressure so long as the brake valve is in the release, running, or holding position, and being connected to atmosphere when the brake valve is in the lap or service position. The cavity for venting the pipe 123 to atmosphere as just explained is ordinarily not present in an engineer's brake valve but is added in accordance with the present invention so that when this brake valve is moved to the lap or service position the excess pressure head pipe 122 is vented to atmosphere.

In Fig. 1, there has also been shown a pneumatically operated timing means for opening a circuit a predetermined time after the engineer's brake valve has been operated to the service position automatically. This timing mechanism TM comprises a timing reservoir 130, which is connected to the excess pressure head governor pipe 123 through pipes 131 and 132. In order to adjustably fix the rate of discharge of pressure from the timing reservoir through the excess pressure head pipe 123 and the ports and cavities in the engineer's brake valve to atmosphere, a graduated restricted opening is provided by the adjustable valve 133. This valve contains a valve plug 134 adapted to fit in a tapered opening, the position of which may be changed by turning the knurled head 135 to which a pointer or indicator 136 is fastened. This indicator moves over a dial 137, which dial may be graduated in any suitable way. In practice, since long trains require more time to get the slack between cars adjusted, it is considered expedient to graduate this dial in the length of the train by marking thereon the number of cars so that the indicator may be moved to a number corresponding to the number of cars which are being pulled at the time. However, if it is considered expedient to take into consideration the average or particular grade over which the train is moving, adjustment for this purpose may be incorporated on this dial also. This timing mechanism also includes a cylinder 140 having a piston 141 therein, which piston is normally maintained in the position shown by main reservoir pressure confined in the timing reservoir 130, thus maintaining the contact 142 in a closed position against the action of the compression spring 143. It readily appears that when the pressure in the reservoir 130 has been reduced to a predetermined pressure, depending upon the strength of the spring 143, the contact 142 will move away from the stationary contacts indicated by arrows, thereby opening the circuit for the electrically operated valve EV.

It should be noted that there is shown a double cock DC having a stem 150 therein to which is fastened the handle 151, this stem being slightly tapered and held in place by the compression spring 152. The right hand portion of this cock, the cross section of which is shown in Fig. 2, is the usual "double heading" cock, which is normally open when the handle 151 as shown is locked by the padlock 153, and this cock blanks the connection between the engineer's brake valve and the brake pipe when it is turned to its abnormal position. The left hand portion of this double cock DC normally connects the device EPV to the large cylinder of the actuator as clearly shown in Fig. 3, and this cock when turned to its abnormal position connects the main reservoir MR to the large cylinder of the actuator as is obvious from Fig. 3 when the valve stem is turned in the counter-clockwise direction through substantially 90 degrees to its abnormal position.

Although a padlock 153 has been shown for locking the double cock DC it is to be understood that this lock may be omitted if desired, especially bearing in mind that the Interstate Commerce Commission at present does not permit the double heading cock to be locked. Also, this double cock DC whether locked or not may be located so as to be accessible only from the ground, in which event the engineer cannot misuse the double heading cock to prevent an automatic brake application when not double heading.

In order to inflict the penalty heretofore mentioned, which in the particular arrangement shown consists of means accessible only from the ground, the engineer is required to alight to the ground and push the reset push button PB and restore the penalty relay PR, this push button PB being accessible from the ground only. This penalty relay PR under normal clear traffic conditions is energized through a stick circuit including its own contact 156, which circuit may be traced as follows:—beginning at the terminal B of a suitable source of energy, wire 157, contacts 82ª operated by the automatic train control apparatus and which open at the same time contacts 82 open, wire 158, front contact 156 of the penalty relay PR, wires 159 and 160, winding of the penalty relay PR, wire 161 to the common return wire C connected to the other terminal of said source of energy. With this penalty relay PR energized, the electro-penumatic valve EPV is also energized through the following circuit:—beginning at the terminal B, wire 162, contact 82, controlled by the train control mechanism, wire 163, winding of the device EPV, wire 164, front contact 165 of the penalty relay PR, wire 166, normally closed contact 167 of the push button PB, wire 168 to the common return wire C. From this latter circuit it will be noted that the device EPV can not be energized when the penalty relay PR is in its de-energized condition; also with the penalty relay PR once de-energized it can not be picked up without first bringing the train to a stop.

It is desired to be pointed out at this time that the supplemental valve 22 forming part of the actuator shown in Fig. 1, is slightly different from that shown in some of the figures in the parent patent. The supplemental valve 22 (see Fig. 4) does not vent the equalizing reservoir to atmosphere through the cavity 77 when the engineer's brake valve is in the lap position as it does in the various systems shown in the parent application (see Fig. 7 showing the lap position of the supplemental valve of the previous systems). In the system shown in Fig. 1, the supplemental valve 22 has its cavity 77 preferably so cut that the reduction reservoir is only vented to atmosphere when the valve is moved toward the release position beyond the lap position, and preferably at a point before it reaches the holding position, that is, it is proposed to provide an additional position of the engineer's brake valve between the lap and the holding position in which the reduction reservoir R¹ may be vented to atmosphere. If desired, however, this venting of the reduction reservoir may take place in the holding position, the object being to permit the engineer to partially vent the reduction reservoir to atmosphere by moving the engineer's brake valve slightly to the left of the lap position without releasing the brakes of the train, which release of brakes takes place rather slowly if the engineer's brake valve is moved to the holding position.

Manual operation (Fig. 1).

In considering the operation of the system shown in Fig. 1, let us assume that the engineer is aware of the fact that an automatic brake application is just about to be effected by the automatic apparatus, and that he wishes to anticipate this automatic application and thereby avoid the penalty, which penalty consists in restoring the penalty relay PR by alighting to the ground and depressing the push button PB, only accessible from the ground. Let us further assume that the engineer considers it necessary to make a multi-stage brake application, in order to bunch the slack between cars properly before the actual full service brake application takes place, and in making a multi-stage brake application moves his valve handle to the service position and leaves it there until the equalizing reservoir pressure has been reduced about eight pounds after which he returns the handle to the lap position. By reason of the modified construction of the supplemental valve 22 as shown in Fig. 4, from that shown in parent application the reduction reservoirs R¹ and R² are not discharged to atmosphere while his handle is in the lap position. With this reduction of eight pounds in equalizing reservoir pressure, the equalizing discharge piston valve, within the engineer's brake valve casing 1, begins to function and causes brake pipe pressure to be discharged through the chamber 95ᵇ and the usual service exhaust fitting 31. This causes the contacts 120ᵇ to close so long as brake pipe pressure is discharging through this equalizing discharge piston valve. It is of course understood that the diaphragm 97ᵇ is pressed outward to close contact 120ᵇ if brake pipe air is exhausted through port 31 at a predetermined rate. In this connection it should be noted that while the engineer's brake valve was in the service position, the stick circuit for the penalty relay PR was completed through a circuit including contacts 170 operated by the handle of the engineer's brake valve, which contacts 170 are closed so long as this valve is in the service or emergency position, which circuit is readily traced in the drawings; and that the stick circuit of the penalty relay PR was closed through a branch circuit including the contacts 120ᵇ which contacts are closed so long as brake pipe pressure is discharging from the brake pipe through the exhaust fitting 31 due to the consummation of a brake application. In other words, if either the engineer has his brake valve in a brake applying position, or brake pipe pressure is discharging from the service exhaust fitting 31, the penalty relay PR is held up independently of the contacts 82ᵃ controlled by the train control mechanism. The net result is, the engineer may make any number of successive reductions in equalizing reservoir pressure without dropping the penalty relay PR in spite of the opening of contacts 82ᵃ, so long as he has either got his handle in a brake applying position or brake pipe pressure is discharging from the service exhaust fitting 31. In this connection it is desired to be pointed out that, although contacts 120ᵇ are also closed when pressure fluid discharges from the exhaust fitting due to an automatic application, the closure of these contacts 120ᵇ under this condition will not prevent the dropping of penalty relay PR, because they close after this relay has already dropped due to opening of contacts 82ᵃ; further contacts 170 do not close at all in response to an automatic application. From this it will be noted, that the engineer is required to leave his valve in the service position after having made several successive reductions in equalizing reservoir pressure, so as to eventually maintain contacts 170 closed and maintain the penalty relay PR energized to avoid the penalty. With the engineer's brake valve finally left in the service position a full service brake application will take place because contacts 53 operated by the engineer's brake valve will be opened under this condition and the reduction reservoirs R¹ and R² will equalize in pressure with the equalizing reservoir pressure, the volumes of these reservoirs being so chosen that a full service brake application results if they are all connected together.

From the above it appears that if an automatic brake application had taken place during any time while the engineer was making a multiple stage manual application the opening of contacts 82 would have de-energized the device EPV and effected an automatic brake application as presently will be described, but by reason of the engineer's anticipation in starting a brake application the opening of contacts 82ᵃ would not have dropped the penalty relay PR, because this penalty relay PR was at all times held up by one or the other of the two supplemental or branch circuits including contacts 170 and 120ᵇ respectively, so that in the structure shown the penalty relay PR is maintained up after the engineer starts and carries out either a single or multi-stage brake application.

Automatic operation (Fig. 1).

Let us now assume that the engineer is not vigilant, is incapacitated or is asleep, and that an automatic brake application is initiated by opening of contacts 82 and 82ᵃ by suitable train control mechanism. The opening of contacts 82ᵃ breaks the stick circuit for the penalty relay PR and the dropping of this penalty relay PR by reason of opening of its front contact 165 opens the circuit for the device EPV, this EPV circuit also being opened at another point by the contacts 82, so that, both the devices EPV and the penalty relay PR are de-energized until the penalty relay PR is again picked up, which is only possible by the operation of the push button PB. With the device EPV de-energized the actuator moves the engineer's brake valve to the service position thereby connecting the equalizing reservoir 80 with the first reduction reservoir R¹, so that the pressure between these two reservoirs equalize thereby effecting a predetermined reduction in the equalizing reservoir pressure. The ratio of the reservoir R¹ to that of the equalizing reservoir is such that this first reduction is about seven or eight pounds below the initial equalizing reservoir pressure.

It should be noted that the electro-pneumatic valve EV is still energized and the second reduction reservoir R² is isolated from the first reduction reservoir R¹. This seven or eight pound reduction in equalizing reservoir pressure effects a light brake application through the medium of the equalizing discharge piston valve of the engineer's brake valve for reasons heretofore given, which brake application bunches the slack, so to speak, and places the cars in relation so that a full service brake application can be made safely. This automatic movement of the engineer's brake valve to the service position causes venting of the excess pressure head governor pipe 123 by connecting a port and cavity leading to the central exhaust opening in the engineer's brake valve. With this excess pressure head governor pipe 123 connected to atmosphere, pressure is gradually vented through the adjustable restriction in the graduated adjustable valve 133 from the timing reservoir 130 to atmosphere, so that contacts 142 are opened a predetermined time after the brake valve has been operated automatically, this time depending on the adjustment of this valve which is fixed for each train depending on the length of the train, and the like. At the expiration of this time contacts 142 open and the electrically operated valve EV is de-energized thereby connecting the reduction reservoirs R¹ and R² together, and effecting a further reduction in equalizing reservoir pressure which by reason of the volumes of these reservoirs will be such as to effect a full service brake application. Irrespective of the fact that contacts 82 and 82ª may have been closed in the meantime, possibly because traffic conditions have cleared up, the device EPV remains de-energized and the brake application continues to be effective until the train is brought to a stop. If the engineer now alights to the ground and presses the push button PB, a pick up circuit for the penalty relay PR is completed which includes the normally open contact 171 of the push button PB. With this penalty relay PR once picked up, and contacts 82 and 82ª closed by reason of improved traffic conditions ahead, this relay PR will again be stuck up through the stick circuit heretofore traced. It should be noted that the push button PB has been protected against misuse or abuse, which abuse may consist in tying this push button PB down so as to continually maintain the pick up circuit for the penalty relay PR closed, by the provision of the normally closed contacts 167 contained in the circuit for the device EPV; whereby, if this push button PB were tied down by the engineer, he would be unable to proceed because the device EPV would remain de-energized and he would be unable to release the brakes. It should be understood that the particular kind of penalty inflicted may vary according to requirements of the various railroads, and that the particular means disclosed is merely illustrative. Further, it should be noted that if the brakes are again released the two reduction reservoirs are again vented to atmosphere, placing them in a condition to effect another predetermined reduction in equalizing reservoir pressure when necessary.

The present invention thus provides brake applying apparatus in which the same rotary valves are used for effecting brake applications manually or automatically, so that this apparatus is repeatedly operated and is therefore not apt to fail to function by reason of rust and gummed up lubrication which might accumulate by reason of infrequent use; this apparatus being constructed so that if automatically operated a predetermined reduction in brake pipe pressure only is made either by a single or a two-stage brake application and if a manual brake application is to be made, a service application of any degree may be carried out without going to emergency, and wherein an emergency brake application may be made by the engineer in spite of the fact that the automatic apparatus is in position to effect a service application.

Having thus shown and described a specific embodiment of the invention and having shown rather specific apparatus for carrying out the invention, it is desired to be understood that the specific apparatus illustrated has been shown for the purpose of clearly disclosing apparatus whereby the functions underlying the present invention may be carried out, and not with the idea of showing the particular apparatus preferably employed in practice nor setting forth the scope of the present invention. For instance, the adjustable orifice for the timing means shown in Fig. 1 may be entirely omitted so that the time between the starting of the two stages of a two-stage brake application is the same for all conditions if desired, and various changes in the circuit arrangement for controlling the electrically operated valve EV and other changes may be made so long as the function is the same without departing from the scope of the present invention or the idea of means underlying the same.

What is desired to be secured by Letters Patent is:—

1. In a braking system for railway trains of the type in which the brake pipe is normally charged and in which a brake application is effected if brake pipe pressure is reduced, the combination with an engineer's brake valve of the type described and usually employed in systems of this type having an excess pressure head governor pipe which is vented if said engineer's brake valve is placed in the service brake applying position, a pneumatic timing device connected to said pressure head pipe, said timing device being constructed so as to perform a function a definite period of time after said pipe is vented.

2. In a braking system for railway trains of the type in which the brake pipe is normally charged and in which a brake application is effected if brake pipe pressure is reduced; in combination an equalizing reservoir, and a reduction reservoir; of an engineer's brake valve of the construction usually employed in systems of this kind but modified by having cavities and ports for connecting the equalizing reservoir to the reduction reservoir when said brake valve is in the service brake applying position, and for connecting said reduction reservoir to atmosphere when the brake valve is in the normal position; a handle for operating said valve; automatic means for simultaneously operatively disconnecting said handle from said valve and operating said valve to the service position; a second reduction reservoir; an electro-pneumatic valve in a pipe connecting said reduction reservoirs, which valve if energized isolates said reservoirs; a contact in the circuit for energizing said electro-pneumatic valve, closed after the lapse of a predetermined interval of time after said automatic means is rendered active, the period of time which lapses between the instant when said automatic means is rendered active and the closure of said contact being adjustable to effect the proper brake application for the particular train the engine is pulling at the time.

3. In a brake applying apparatus for automatic train control systems used on trains employing a braking system of the type in which the brake pipe is normally charged and in which venting of the brake pipe effects a brake application, the combination of mechanism initiated automatically by suitable train control mechanism comprising, means for effecting a predetermined reduction in brake pipe pressure upon actuation of said control mechanism, and means including a time element device for effecting a further reduction in brake pipe pressure a predetermined period of time after said first mentioned means is actuated, said time element device being adjustable to effect the proper spacing between the two stages of brake pipe pressure reduction for the length of the particular train the engine is pulling at the time.

4. In a brake applying apparatus for automatic train control systems used on trains employing a braking system of the type in which the brake pipe is normally charged and in which venting of the brake pipe effects a brake application, the combination of mechanism initiated automatically by suitable train control mechanism comprising, means for effecting a predetermined reduction in brake pipe pressure upon actuation of said control mechanism, and means including a time element device for effecting a further reduction in brake pipe pressure a predetermined period of time after said first mentioned means is actuated, said time element device being changeable and calibrated so as to be readily adjustable to effect the proper two stage reduction for the length of the particular train the engine is pulling at the time.

5. A brake valve actuator constructed so as to be readily superimposed upon an engineer's brake valve of the usual construction comprising a small cylinder having a piston therein and directly connected to the main reservoir pressure supply contained on top of the rotary valve of such engineer's brake valve, a large cylinder having a piston therein acting in opposition to the piston of the small cylinder and normally connected to main reservoir pressure, whereby if pressure is vented from the large cylinder said actuator is operated, an electro-pneumatic valve for supplying and removing pressure from said large cylinder, and a cut-out cock normally connecting said large cylinder to said electro-pneumatic valve and which if operated to its abnormal position connects said large cylinder to said small cylinder.

6. A brake valve actuator constructed so as to be readily superimposed upon an engineer's brake valve of the usual construction comprising a small cylinder having a piston therein and directly connected to main reservoir pressure contained in the space on top of the rotary valve of such engineer's brake valve; a large cylinder having a piston therein acting in opposition to the piston in the small cylinder and normally connected to main reservoir pressure; whereby if pressure is vented from the large cylinder said actuator is operated; an electro-pneumatic valve for supplying and removing pressure from said large cylinder; and a cut-out cock, mechanically connected to the usual double heading cock contained in the brake pipe connection leading to said engineer's brake valve, normally connecting said large cylinder to said electro-pneumatic valve and which if said double heading cock is operated to the double heading position said cut-out cock connects said large cylinder to main reservoir pressure.

7. A brake valve actuator constructed so as to be readily superimposed upon an engineer's brake valve of the usual construction comprising a small cylinder having a piston therein and directly connected to main reservoir pressure contained in the space above the rotary valve of such engineer's brake valve; a large cylinder having a piston therein acting in opposition to the piston in the small cylinder and normally connected to main reservoir pressure; whereby if pressure is vented from the large cylinder said actuator is operated; an electro-pneumatic valve for supplying and removing pressure from said large cylinder; a cut-out cock, mechanically connected to the usual double heading cock contained in the brake pipe connection leading to said engineer's brake valve, normally connecting said large cylinder to said electro-pneumatic valve and which cut-out cock if said double heading cock is operated to the double heading position connects said large cylinder to main reservoir pressure; and a lock for locking said double heading cock.

8. A brake valve actuator constructed so as to be readily superimposed upon an engineer's brake valve of the usual construction comprising a small cylinder having a piston therein and directly connected to main reservoir pressure contained in the space above the rotary valve of such engineer's brake valve, a large cylinder having a piston therein acting in opposition to the piston in the small cylinder and normally connected to main reservoir pressure, whereby if pressure is vented from the large cylinder said actuator is operated, an electro-pneumatic valve for supplying and removing pressure from said large cylinder, and a cut-out cock normally connecting said large cylinder to said electro-pneumatic valve and which if operated to its abnormal position connects said large cylinder to said small cylinder, and a seal for locking said cut-out cock into its normal position.

9. In an automatic train control system the combination with the usual air brake system including the usual engineer's brake valve and a normally charged brake pipe and wherein if the brake pipe is vented to a predetermined extent a full service brake application is effected, means superimposed upon said engineer's brake valve and effecting such predetermined reduction only in brake pipe pressure if said engineer's brake valve is moved to and left in the brake applying position, means for automatically applying the brakes, means for penalizing the engineer if the brakes are automatically applied, and means for suppressing such penalty if the engineer places the engineer's brake valve in the brake applying position before an automatic brake application is initiated and leaves it in such position.

10. In an automatic train control system the combination with the usual air brake system including the usual engineer's brake valve and a normally charged brake pipe and wherein if the brake pipe is vented to a predetermined extent a full service brake application is effected, means superimposed upon said engineer's brake valve for effecting such predetermined reduction only in brake pipe pressure if said engineer's brake valve is moved to and left in the brake applying position, means for automatically applying the brakes, means for penalizing the engineer if the brakes are automatically applied, and means for suppressing such automatic brake application if the engineer places his engineer's brake valve in the brake applying position before an automatic brake application is initiated and keeps the brake valve in such position.

11. Brake applying apparatus for air brake systems of the type in which the brake pipe is normally charged with fluid pressure, and wherein venting of the brake pipe to a predetermined extent effects a full service brake application; in combination with the usual brake pipe and a main reservoir containing fluid pressure; an engineer's brake valve having a running, a lap and a service position, for charging the brake pipe from said main reservoir and venting said brake pipe to atmosphere; and of means associated with said brake valve whereby a multistage brake application may be made by repeated movements of said engineer's brake valve between the service and lap positions permitting venting of the brake pipe to a predetermined extent only, and whereby if during such repeated movements the valve is moved to a position between the running and lap position the brake pipe will be vented to a greater extent.

12. Brake applying apparatus for air brake systems of the type wherein the brake pipe is normally charged and wherein venting of the brake pipe causes an application of the brakes, the combination with a manually operable valve having ports and passages whereby movement of said valve to different positions may effect charging or venting of said brake pipe, and means associated with said valve whereby if said valve is moved back to a lap position a plurality of times a multistage manual brake application is made by venting of the brake pipe to a predetermined extent only but if the valve is moved slightly beyond the lap position upon its return from a brake applying position and is thereafter moved to the brake applying position the brake pipe is vented to a greater extent.

13. In an air brake system of the normally charged brake pipe type, the combination with an engineer's brake valve for venting and charging the brake pipe to effect an application and a release of the brakes respectively, and means superimposed on said engineer's brake valve whereby if this valve is repeatedly moved to a brake applying position and back to the lap position manually a predetermined reduction only in brake pipe pressure is made and which includes means whereby a further reduction in brake pipe pressure may be made by the engineer without placing the engineer's brake valve in the emergency position.

14. Automatic means for effecting a brake application suitable for the train of a predetermined length, and adjustable means for changing the character of brake application made by said automatic means which if adjusted to a position corresponding to the length of the train will cause said automatic means to effect the desired character of brake application.

15. In an air brake system of the normally charged brake pipe type, the combination with an engineer's brake valve having a brake pipe charging a brake pipe venting and a lap position, and means superimposed on said engineer's brake valve whereby if said valve is moved to a venting position the brake pipe is vented to a predetermined extent only but if said valve is then momentarily moved toward the charging position beyond the lap but not actually to the charging position and is then moved to the venting position the brake pipe is further vented.

16. In an air brake system of the normally charged brake pipe type, the combination with an engineer's brake valve having a release, running, lap, service and emergency position in the order given; reduction limiting means effective if said valve is moved to the service position the brake pipe is vented to a predetermined extent only; and other means for permitting the reduction limiting means to effect further reduction of brake pipe pressure with the valve in the service position which is rendered effective if the valve is moved momentarily to a position between the running and lap position.

17. In an air brake system of the normally charged brake pipe type, the combination with an engineer's brake valve having a release, running, reduction increasing, lap, service and emergency position in the order given; and means superimposed on said engineer's brake valve whereby if said valve is moved to the service position the brake pipe is vented to a predetermined extent only but if said valve is momentarily moved to the reduction increasing position and is then moved back to the service position the brake pipe is further vented.

In testimony whereof I affix my signature.

CHARLES S. BUSHNELL.